United States Patent [19]
Potter et al.

[11] 3,953,355
[45] Apr. 27, 1976

[54] PREPARATION OF URANIUM NITRIDE

[75] Inventors: Ralph A. Potter, Lynchburg, Va.; Victor J. Tennery, Upper Arlington, Ohio

[73] Assignee: The United States of America as represented by the United States Energy Research and Development Administration, Washington, D.C.

[22] Filed: May 29, 1974

[21] Appl. No.: 474,284

[52] U.S. Cl. .................. 252/301.1 R; 423/250; 423/251; 423/252; 423/254
[51] Int. Cl.$^2$ .................. C01G 43/00; C01G 56/00; C01F 15/00
[58] Field of Search .......... 423/254, 252, 251, 250; 252/301.1 R

[56] References Cited
UNITED STATES PATENTS

| | | | |
|---|---|---|---|
| 3,180,702 | 4/1965 | Lapat | 423/254 |
| 3,322,510 | 5/1967 | Anselin et al. | 423/251 |
| 3,758,669 | 9/1973 | Potter et al. | 423/249 X |
| 3,860,691 | 1/1975 | Gens | 423/254 |

*Primary Examiner*—Edward A. Miller
*Attorney, Agent, or Firm*—Dean E. Carlson; David S. Zachry; John B. Hardaway

[57] ABSTRACT

A process for preparing actinide-nitrides from massive actinide metal which is suitable for sintering into low density fuel shapes by partially hydriding the massive metal and simultaneously dehydriding and nitriding the dehydrided portion. The process is repeated until all of the massive metal is converted to a nitride.

4 Claims, 1 Drawing Figure

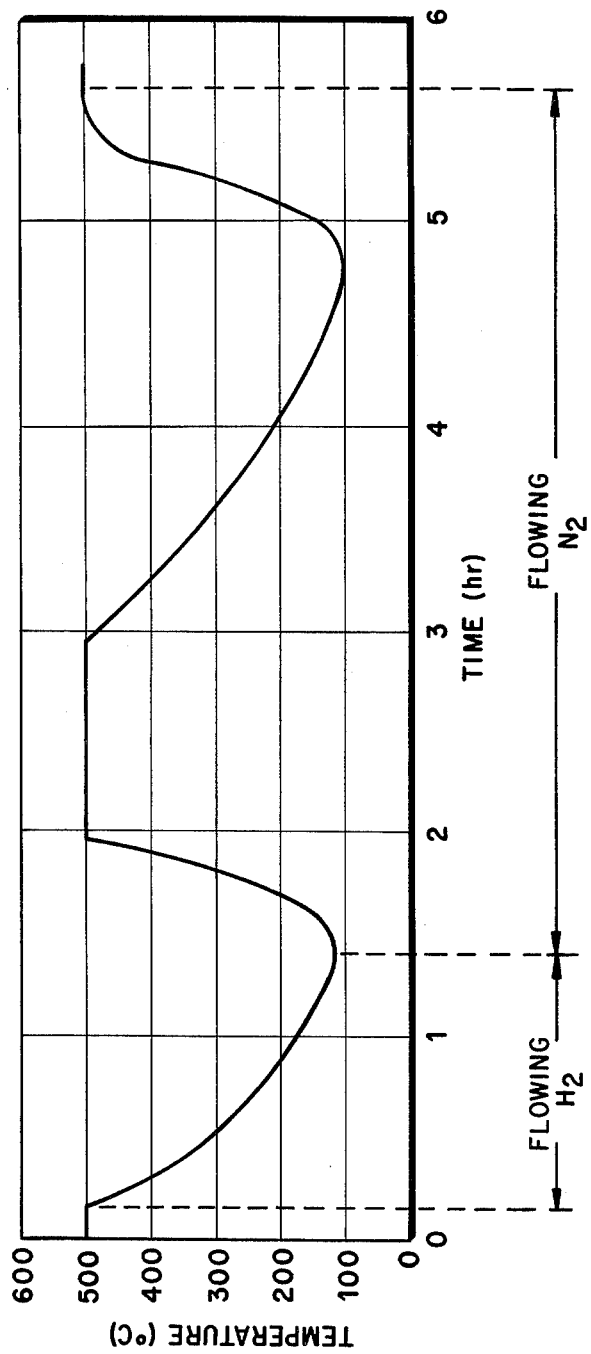

PREPARATION OF URANIUM NITRIDE

This invention occurred in the course of, or under, an interagency agreement between the United States Atomic Energy Commission and the National Aeronautics and Space Administration. It relates generally to the art of forming metal nitrides from massive actinide metals.

BACKGROUND OF THE INVENTION

As is explained in U.S. Pat. No. 3,758,669, the formation of nitrides from massive pieces of actinide metals involves problems associated with the highly exothermic nitriding reaction. Of particular interest is the formation of uranium nitride from massive uranium metal.

One prior-art technique of forming uranium nitride from massive uranium metal is to hydride and dehydride the massive uranium metal until the entire mass of metal is broken down into uranium metal powder. The uranium metal powder thus formed is subjected to a controlled nitrogen atmosphere in order to convert the metal to the nitride. Due to the highly exothermic nitriding reaction, the temperature and rate of reaction are exceedingly difficult to control. Even under the very best conditions, there are always areas within the uranium metal which react too vigorously with the excess heat melting adjacent areas of uranium metal. The melted areas show up as agglomerates which must be separated and reprocessed. The process is generally dangerous and requires 3 to 4 weeks to convert a 1- to 1-½-kilogram mass.

One method of overcoming the problems of the above prior art is disclosed in U.S. Pat. No. 3,758,669. That process comprises first forming uranium hydride powder from the massive uranium metal in a conventional manner and then incrementally dehydriding and nitriding the dehydrided portion during a cyclic heating process. This process overcomes the problems associated with the highly exothermic reaction and is complete within about four days or less. The uranium nitride produced by this process sinters to about 95 percent of theoretical density with isolated porosity. However, due to the high density and non-connected porosity of this material, fission product gases, basically helium, produced during irradiation cause swelling and dimensional changes within the sintered specimens.

SUMMARY OF THE INVENTION

It is thus an object of this invention to provide a process for producing actinide nitrides from massive actinide metal which eliminates the problems associated with the highly exothermic nitriding reaction.

It is a further object of this invention to provide a process which will produce actinide nitride powder suitable for sintering to a low density, thermally stable compact having interconnected porosity so as to absorb fission product gases while retaining dimensional stability.

It is a particular object of this invention to provide such a process for the formation of uranium nitride from massive uranium metal.

These as well as other objects are accomplished by a cyclic heating process with controlled nitrogen and hydrogen atmospheres. The process is carried out by heating the massive metal in a vacuum to a temperature within the range of 450° to 550°, preferably 500° C., admitting hydrogen maintained at a slight positive pressure, preferably flowing at a pressure of 5 to 6 psig, cooling the metal in the hydrogen atmosphere to a temperature of from room temperature to 150°C., preferably 100°C., to allow metal hydride to form on the surface of the massive metal, admitting nitrogen at a positive pressure, preferably flowing at a pressure of 5 to 6 psig, and heating the metal to a temperature within the range of 300° to 550° C., preferably 500°C., to allow dehydriding and nitriding to occur, cooling the reactants to a temperature within the range of room temperature to 150°C., preferably 100°C., reheating the reactants to a temperature within the range of 300° to 550°C., preferably 500°C., and repeating the above steps until substantially all of the massive metal has been converted to a nitride.

BRIEF DESCRIPTION OF THE DRAWING

The single FIGURE of drawing is a temperature-vs.-time chart of the conditions used in carrying out the process of this invention.

DETAILED DESCRIPTION

The process of this invention is applicable to forming nitrides from massive actinide metals selected from thorium, uranium, (uranium, plutonium), plutonium, americium, and neptunium. As used within this disclosure, the term "massive" means a single piece of metal having a mass of 0.1 kilogram or greater. As pointed out previously, uranium nitride is the material of principle interest among the above-listed actinides. The remainder of the description will be given with particular reference to the formation of uranium nitride; however, the specified conditions are equally applicable to the above-listed actinides.

The process of this invention is concerned with uranium nitride in stoichiometries of from UN to $UN_{1.75}$. By the use of the term "uranium nitride," it is meant to include stoichiometries within the above range. Uranium nitride powder produced by the process of this invention is capable of being heat treated by known methods to form a desired stoichiometry within the above range.

The process of this invention overcomes several problems which are inherent in the formation of uranium nitride. Uranium metal is highly reactive and any exposure to oxygen will produce oxide contaminants in the resulting nitride. By using massive metal and an integrated continuous process, the process of this invention minimizes contact with oxygen. As is previously disclosed, the process must be carried out so as to avoid temperature surges caused by the highly exothermic nitriding reaction. By carrying out the nitriding reaction while the hydride is decomposing, the reaction itself as well as the amount of material available for reaction is limited. Apparently a phenomenon associated with the hydrogen surrounding the dehydrided particles limits the reaction with nitrogen. While solving the last-mentioned problem, the resulting nitride powder must be of a morphology suitable for sintering to a thermally stable, low density body. Apparently the double heating step while retaining a nitrogen atmosphere produces the correct morphology for sintering bodies which are about 85 percent of theoretical density.

The process of this invention not only solves the above problems but takes only a fraction of the time required for the prior-art processes. The resulting nitride powder produced by the process of this invention can be sintered by heating from room temperature to 2300°C. using a single atmosphere of $N_2$, whereas the powder of the prior-art processes requires an initial vacuum or other inert atmosphere up to about 1450°C. prior to switching to an $N_2$ atmosphere.

According to this invention, it has been found that the specific hydride, dehydride, nitride process disclosed herein forms particles of uranium nitride having a size within the range of 1 to 10 micrometers and a surface area of about 6.5 to 7 square meters per gram and which upon compaction and sintering produces a stable shape with about 10 to 17 percent interconnected porosity capable of maintaining fission product gases without swelling.

The process of this invention is carried out by, as is generally depicted in the FIGURE of drawing, heating a massive piece of uranium metal under vacuum to a temperature of about 500°C. within an enclosed reaction chamber.

Hydrogen is introduced into the reaction chamber at the 500°C. point and maintained at a pressure of about 6 psig. The hydrogen is preferably flowing and maintained at a sufficient positive pressure to minimize the possibility of oxygen inleakage. The temperature is lowered to about 100°C. while maintaining the hydrogen pressure at about 6 psig. Below about 200°C. uranium hydride forms on the surface of the massive uranium metal and begins to flake off. When the temperature reaches about 100°C., hydrogen is flushed from the reaction chamber by a flowing stream of nitrogen maintained at a slight positive pressure, preferably 5 to 6 psig. The contents of the chamber are reheated to about 500°C. while maintaining the flow of nitrogen. As the temperature is raised from 100° to 500° C., either the metal hydride flakes decompose and react with nitrogen to form uranium nitride or the uranium hydride flakes react directly with nitrogen to form uranium nitride with the former reaction being more likely. Upon reaching 500°C. the contents of the chamber are soaked while maintaining the flow of nitrogen for a period of time sufficient to nitride the available free uranium. This generally requires about one hour. The contents of the chamber are then cooled to 100°C. and reheated to 500°C. while retaining the nitrogen atmosphere. This step is essential to the process and apparently is the key to the resulting powder having the correct morphology for sintering to a low density. The cooling and reheating steps give the uranium a chance to react with the nitrogen and residual hydrogen at an optimum temperature. At the 500°C. point, the chamber is evacuated to about 100 Torr, whereupon a second cycle is begun. Generally, about four cycles are required to completely covert a 1-kilogram mass.

Uranium nitride powder produced by this process has a stoichiometry of about $UN_{1.74}$ by chemical analysis. However, the powder may be treated by heating at 900°C. under vacuum to adjust the stoichiometry down to UN. Such a process is described in U.S. Pat. No. 3,758,669.

Having generally described the invention, the following specific examples are given as a further illustration thereof.

EXAMPLE I

A kilogram block of uranium metal was treated to remove all surface oxides by immersing the metal in a 1-N solution of nitric acid. The metal was then washed with absolute ethanol several times and stored under ethanol until transfer into an inert atmosphere within a glove box. Prior to loading into the reaction chamber, the metal was subjected to a vacuum of about $4 \times 10^{-4}$ Torr and then placed in an atmosphere of pure argon. The metal was placed in a half-cylinder tungsten boat which had tungsten grate rods running longitudinally thereof for supporting the massive piece of uranium metal and for allowing the fragmented powders to fall to the lower section of the boat. The boat was placed into the reaction chamber of the apparatus described in U.S. Pat. No. 3,758,669.

The reaction chamber containing the cleaned uranium metal was heated to 500°C. under a vacuum of $1 \times 10^{-5}$ Torr ($1.3 \times 10^{-3}$ N/m$^2$), and hydrogen was then admitted to 6 psig (41 kN/m$^2$) as is graphically depicted in the FIGURE of drawing. The furnace was rolled off the reaction chamber to facilitate cooling, and the uranium was hydrided as the charge cooled to about 100°C. Hydrogen was continuously supplied via a manostat to maintain the pressure at 6 psig (41 kN/m$^2$). At 100°C., nitrogen replaced hydrogen as the manostat supply gas and was allowed to sweep most of the hydrogen from the retort. The furnace was rolled back over the retort, and as the charge heated, the hydride-dehydride-nitride reactions occurred, releasing hydrogen, which was swept from the retort as nitrogen was admitted. A 1-hour soak at 500°C. was followed by a cooling to 100°C. and a reheating to 500°C., whereupon the retort was evacuated to about 100 Torr (13 kN/m$^2$) and refilled with hydrogen for the next cycle. After four of these cycles, the evacuated retort was filled with argon, sealed off, and removed to the glove box for unloading. The entire process required about 20 hours. Since only four cycles were necessary for producing the $UN_{1.74}$ powder, and the final vacuum treatment used for $UN_{1.20}$ powder was omitted, the time invested in the synthesis was only a fraction of that required by the prior-art process.

EXAMPLE II

After synthesis, the material was unloaded in an inert-atmosphere glove box and stored in gas-tight, screw-lid jars. As needed, quantities were withdrawn from this material and loaded into a tungsten can. This, in turn, was placed in a flanged, O-ring-sealed can for transport to a heat-treatment furnace. The tungsten can containing the powder was transferred into the furnace under cover of high-purity argon in a glove bag located over the furnace loading port. The cold-wall furnace, with tungsten heating shields and element, was evacuated and heated to the desired temperature in approximately 1.5 hours.

Only two lots from the $UN_{1.74}$ synthesized batch were conditioned by heat treatment--one at 1200°C. for 3 hours below $5 \times 10^{-6}$ Torr ($7 \times 10^{-4}$ N/m$^2$) and the other at 850°C. for 16 hours below $5 \times 10^{-4}$ Torr (0.07 N/m$^2$). The furnace was cooled under vacuum to room temperature and the powders were transferred to the glove box by a reverse procedure of that employed during loading.

The particle size and surface areas were determined using conventional techniques to compare $UN_{1.20}$ produced by the process of U.S. Pat. No. 3,758,669 and $UN_{1.74}$. Typical results are shown in Table I, below. Within the scatter of the data, and contrary to expectations, little increase in particle size occurred during the heat treatments of the powders; however, the specific surface areas did decrease considerably, implying that the initial particles contained surface irregularities that were removed during the thermal conditioning. These effects were more pronounced in the $UN_{1.74}$ powder. When this material was heated at 1200°C., the powder particles were coarser and had lower surface area than those derived from a similarly conditioned $UN_{1.20}$ powder.

Table 1

| Batch Code | Conditioning Temperature (°C.) | Time (hr.) | Particle Size, μm, and Distribution | | | Specific Surface Area (m²/g) |
|---|---|---|---|---|---|---|
| | | | 90%ᵃ | 50%ᵃ | 10%ᵃ | |
| $UN_{1.20}$ | As synthesized | | 8.0 | 2.9 | 1.2 | 1.2 |
| $UN_{1.20}$ | 1200 | 3 | 8.3 | 3.0 | 1.4 | 0.38 |
| $UN_{1.74}$ | As synthesized | | 10.7 | 3.5 | 1.1 | 6.8 |
| $UN_{1.74}$ | 1200 | 3 | 14.8 | 5.0 | 1.6 | 0.24 |

ᵃPercentages are for "% finer than size indicated."

EXAMPLE III

The sintering behavior of the thermally treated powders was tested by fabricating rods from the powders. The rods were isostatically pressed at 60,000 psi (410 MN/m²) without the addition of any material to the powders. The resulting rods measured approximately 0.3 × 1.3 in. (7.6 × 33 mm) and weighed 18 g.

The sintering behavior of specimens prepared from the $UN_{1.74}$ powder (as synthesized and thermally conditioned) was entirely different from that of the specimens prepared from the $UN_{1.20}$ material. All specimens prepared from the $UN_{1.74}$, regardless of the conditioning treatment, densified to approximately 85% of theoretical (14.32 g/cm³) when sintered at 2350°C. for 2 hours. Furthermore, changes in the sintering scheme did not affect the sinterability. Heating in nitrogen from room temperature led to insignificantly lower final densities than did heating in vacuum to 1400°C. or heating in argon to 1450°C. before changing to nitrogen.

The microstructures of the samples were significantly different from those of the $UN_{1.2}$-derived samples. The matrix consisted of dense grains with large, irregular pores at multiple grain boundaries, whereas the $UN_{1.20}$ material sintered at 2300°C. contained spherical pores, primarily within the grains, and relatively clean grain boundaries. The lower degree of densification exhibited by the powders made from $UN_{1.74}$ material is probably related to the morphology of the original powder particles. As noted above, the as-synthesized powder consisted of relatively coarse particles containing many surface irregularities. Apparently, as the material was heated, either for conditioning or sintering, the particles grew rapidly and became inactive at relatively low temeratures as the surface irregularities were removed by various diffusion processes.

On the basis of the above Examples, the $UN_{1.74}$ prepared as described above exhibits the following features:

1. The $UN_{1.74}$ powder had a coarser particle size and larger surface area than the conventional $UN_{1.20}$.
2. Thermal conditioning of $UN_{1.74}$ powder had essentially no effect on densities obtained on sintering at 2350°C.
3. Compacts of $UN_{1.74}$ powders could be heated to about 1400°C. under vacuum, argon, or nitrogen with no detrimental effects. Subsequent heating to 2350°C. in $N_2$ yielded compacts of essentially constant density (84 to 88 percent of theoretical).
4. Sintered samples prepared from $UN_{1.74}$ powder were characterized by relatively low densities, attributed to small, dense grains of UN with large, irregular pores at multiple grain boundaries. Different behavior was noted for specimens prepared from $UN_{1.20}$ powder, which, when sintered at comparable temperatures, contained small spherical pores within very large grains and clean grain boundaries and yielded densities about 95 percent of theoretical.

What is claimed is:

1. A process for producing a nitride from an actinide metal selected from the group consisting of thorium, uranium, (uranium, plutonium), plutonium, americium, and neptunium comprising the steps of:

heating said metal within a reaction chamber containing a non-reactive atmosphere to a temperature within the range of 450° to 550° C.;
admitting hydrogen to said reaction chamber;
cooling said metal to a temperature at which partial hydriding of said metal occurs;
admitting nitrogen to said reaction chamber so as to flush out said hydrogen;
heating said reaction chamber through a temperature range in which dehydriding and nitriding occur;
maintaining the temperature within said last-mentioned temperature range until nitrogen is substantially no longer consumed;
cooling said reaction chamber to said hydriding temperature;
reheating said reaction chamber to said temperature range in which dehydriding and nitriding occur; and
repeating the above steps until substantially all of said metal is converted to a nitride.

2. The process according to claim 1 wherein said metal is uranium.

3. The process according to claim 2 wherein the resulting uranium nitride has a stoichiometry of about $UN_{1.74}$.

4. The product of the process of claim 2, wherein the product uranium nitride has a size within the range of 1 to 10 micrometers and a surface area of about 6.5 to 7 square meters per gram.

* * * * *